United States Patent [19]
Brown et al.

[11] Patent Number: 5,222,123
[45] Date of Patent: Jun. 22, 1993

[54] REGISTRATION AND AUTOMATIC CALL REDIRECTING FOR CORDLESS TELEPHONE SYSTEMS

[75] Inventors: David L. Brown, Miami; Stelios Patsiokas, Plantation, both of Fla.

[73] Assignee: Motorola, Inc., Schaumburg, Ill.

[21] Appl. No.: 764,987

[22] Filed: Sep. 23, 1991

Related U.S. Application Data

[63] Continuation of Ser. No. 461,858, Jan. 8, 1990, abandoned.

[51] Int. Cl.$^5$ .............................................. H04M 11/00
[52] U.S. Cl. .................................... 379/57; 379/58; 379/210; 379/212
[58] Field of Search ............................... 379/57–61, 379/63, 67, 201, 210–212

[56] References Cited

U.S. PATENT DOCUMENTS

| | | | |
|---|---|---|---|
| 4,117,270 | 9/1978 | Lesea | 379/211 |
| 4,456,793 | 6/1984 | Baker et al. | 379/96 |
| 4,748,655 | 3/1988 | Thrower et al. | 379/60 |
| 4,771,448 | 9/1988 | Koohgoli et al. | 379/63 |
| 4,833,702 | 5/1989 | Shitara et al. | 379/60 |
| 4,852,148 | 7/1989 | Shibata et al. | 379/61 |
| 4,941,203 | 7/1990 | Patsiokas et al. | 379/67 |
| 4,980,907 | 12/1990 | Raith et al. | 379/63 |

FOREIGN PATENT DOCUMENTS

| | | | |
|---|---|---|---|
| 0126753 | 6/1987 | Japan | 379/212 |
| 2130848 | 6/1984 | United Kingdom | 379/212 |
| 0212761 | 8/1986 | United Kingdom | |

OTHER PUBLICATIONS

Brochure: Motorola, "EMX Electronic Switching Equipment-A Family Mobile Telephone Exchanges", 1982.

Electronic Industries Association proposal, "Straw Man For Automatic Roaming", pp. 1–24, Jun. 18, 1985.

*Primary Examiner*—Curtis Kuntz
*Assistant Examiner*—Dwayne D. Bost
*Attorney, Agent, or Firm*—M. Mansour Ghomeshi; Michael J. Buchenhorner

[57] ABSTRACT

A method for redirecting calls to a cordless telephone wherein the user of the cordless telephone registers a location code at a call redirecting module. The location code informs the call redirecting module to redirect calls, that are directed to a first telephone unit, to a base station which is part of a network. The base station transmits the call, so that the cordless telephone receives the call if it is within the range of the base station. In the event that the cordless telephone receives the call, it transmits an acknowledgement signal. The base unit will cease to transmit the call if it does not detect the acknowledge signal within a predetermined time interval.

1 Claim, 2 Drawing Sheets

REGISTRATION AND AUTOMATIC CALL REDIRECTING FOR CORDLESS TELEPHONE SYSTEMS

This is a continuation of application Ser. No. 07/461858 filed Jan. 8, 1990 and now abandoned.

TECHNICAL FIELD

This invention relates generally to communications systems, and more specifically, to cordless telephone systems.

BACKGROUND

Cordless telephone systems allow their users to take their telephone handsets away from the home or office to wherever they go (within a service area) and to place telephone calls through base stations (i.e., wireless telephone booths or telepoints). However, the base station, relaying the call from the cordless phone user to another communication unit in the network, may not have the ability to redirect (i.e., forward) calls from the network to the cordless phone user because base stations may not have the capability to locate a given handset through a paging procedure, and thus can only process calls initiated by handsets. One approach to solving this limitation is giving the user the option to obtain a handset with a built-in wide area numeric pager. A caller can send his, or her, telephone number to a central office to be forwarded through a wide area paging system. The pager in the cordless handset decodes the number and alerts the user that a page has been received. The cordless handset user, in turn, has to find a telepoint base station to return the call. A system that allows the user of the cordless handset to answer redirected calls with the cordless handset, without paging, is therefore desirable.

SUMMARY OF THE INVENTION

Accordingly, it is an object of the present invention to provide a cordless telephone call redirecting system that overcomes the shortcomings of the prior art.

Briefly, according to the invention, a call made from a first communication unit to a second communication unit is redirected to a portable communication unit by a call redirecting module and a base station. The method of the invention requires the registration of a location code and an identification code at the call redirecting module, so that the redirecting module "knows" where to redirect calls that were directed to the second unit. The location code corresponds to a selected base station that is to receive the redirected calls and retransmit them to the portable unit and the identification code identifies the portable unit to which the call is to be redirected to. Upon receiving the redirected call, the portable unit transmits an acknowledgement signal to inform the base station that it is receiving the call. In the event that the portable unit does not receive the call, the base station will automatically discontinue call redirecting after a predetermined time interval.

DETAILED DESCRIPTION OF THE PREFERRED EMBODIMENT

Figure 1:
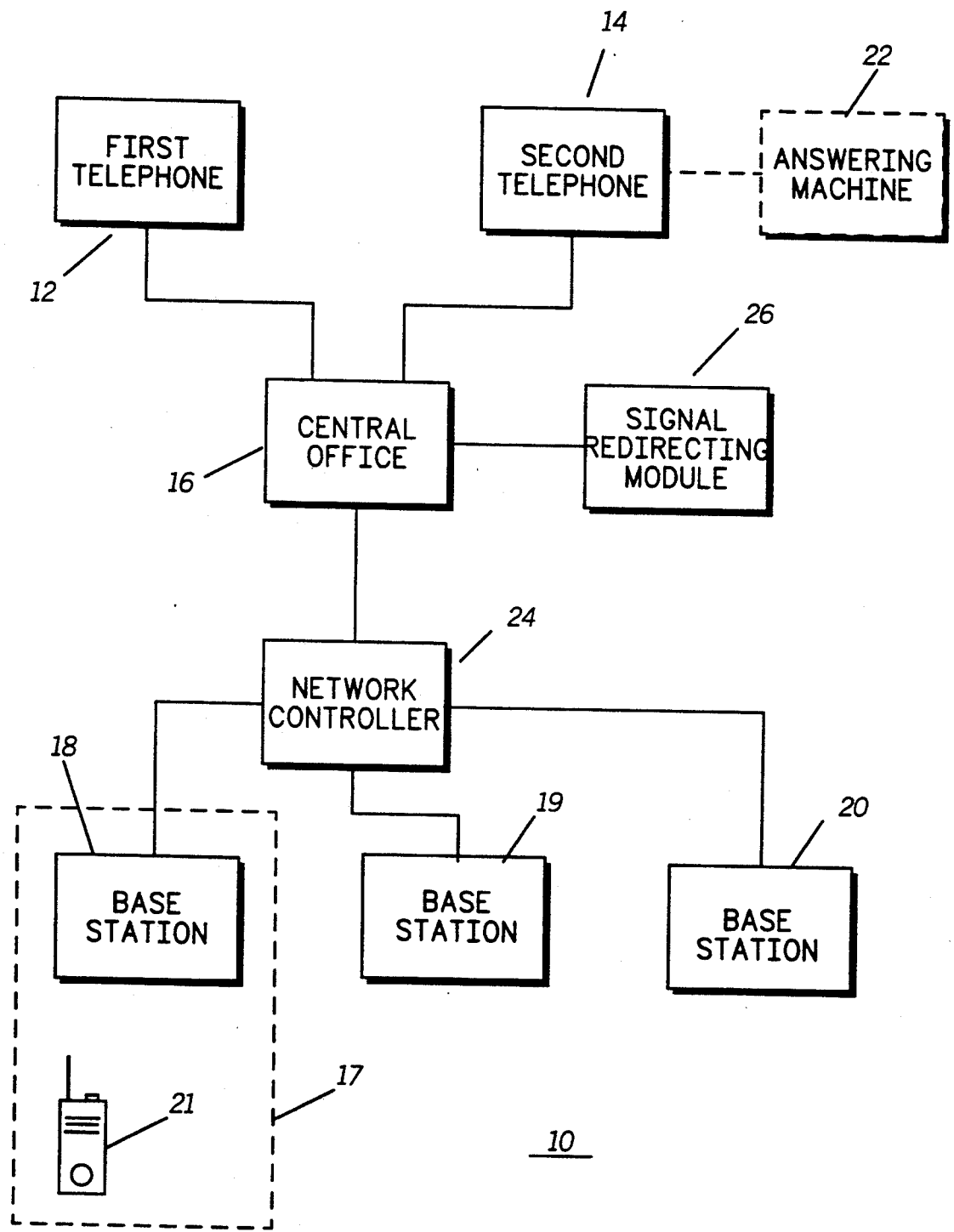
FIG. 1 shows a cordless telephone call redirecting system in accordance with the invention.

Referring to FIG. 1, a cordless telephone call redirecting system 10 in accordance with the invention is shown. The system 10 includes a first telephone 12 and a second telephone 14 (possibly coupled to an answering machine 22). The first telephone 12 and the second telephone 14 represent any telephones within an existing telephone network. Both the first and second telephones are coupled to a central office 16 that includes a signal redirecting module 26. The central office 16 is also coupled to a network controller 24, and may also provide other communication services to the system 10. A plurality of base stations (represented by base stations or telepoints 18-20) are coupled to the network controller 24. Base station 18 is in the location 17. A portable unit 21 (or cordless telephone handset) may be carried throughout the network of base stations, but is shown to be in the location 17, in FIG. 1. The network controller 24 interfaces with the base stations 18-20 so that it may provide billing information. The network controller 24 may also provide the capability to discontinue service to a base station that is delinquent on its service bills. Moreover, the network controller 24 interfaces with the central office 16 for outbound calls (i.e., calls directed outside the system 10).

As an example of the operation of the invention, a user of the portable 21 is at home, but plans to be at location 17 (a restaurant, in this example) and wishes to have calls, that are received at his residential telephone (represented by telephone 14) forwarded (i.e., redirecting transmissions of information signals) to the base station 18 at the restaurant 17. The user may register a location code and an identification code (identifying the portable unit 21) at a central office 16 (i.e., a sign-on). The location code is associated with the base station 18 so that the central office 16 "knows" where to redirect the calls. Thus, when a call (originated by the first telephone, for example) is directed to the user's residential telephone 14, the central office attempts to redirect the call to the portable unit 21 (through the base station 18). The base station 18 would then forward the calls to the portable 21 (if it is in the restaurant 17). If the call arrives while the portable user is in transit to the restaurant 17, the base station informs the person making the call that the call has been forwarded but that the portable user is not at the restaurant yet. The base station 18 may also allow the caller to leave a message in a voice tank that will be provided to the portable user upon his arrival at the restaurant 17. The base station 18 determines when the portable unit 21 arrives at the restaurant 17 by polling (i.e., transmitting polling signals) for a predetermined period (e.g. thirty minutes) and receiving an acknowledgement signal from the portable unit 21 when it arrives at the restaurant 17. Upon completing this "handshake" procedure, the base station 18 changes from operating as a message center to operating in a call redirection mode. Alternatively, the base station may remain in its "message center" mode until the portable user changes its operating mode. On the other hand, if the portable user has arrived at the restaurant when the call arrives, an automatic log-on procedure allows the portable user to receive the call. Upon receiving the call, the portable unit 21 transmits an acknowledgement signal, informing the base station 18 that the call was received. In the event that the call is not answered, the base station 18 informs the central office 16 to stop redirecting calls from the second telephone 14.

If the portable user is at or near the restaurant 17, he would send to appropriate base station 18, a registration request with a central office identifier and a portable identification number (PID). The base station 18 then connects with the central office 16 (e.g., through a modem) and dials the PID and call redirect command, so that the central office 16 can redirect the user's calls there. The central office 16 then confirms the call redirect request and the base station 18 sends the portable 21 a registration (i.e., sign-on) grant. Thus, if a call is made by the user of a first telephone 12 to a second telephone 14 (at the user's residence), the central office 16 redirects the call to the base station 18 which repeats (i.e., re-transmits) the redirected call to the portable unit 21. The portable user may then answer the call in a conventional manner.

Call redirection can also be discontinued by several sign-off procedures. First, the portable user may use a manual sign-off procedure by dialing a sign-off command from the base station 18. Second, if the user has left the base station 18, he may use the portable 21 to send the base station's location code to the central office 16 and enter a sign-off command. Moreover, in this embodiment, the base station 18 (after a predetermined time from sign-on), polls each of the registered portables to determine if it is on, or near the premises. In the event that the base station 18 does not receive a response from the portable unit 21 after several polling periods, the base station 18 automatically calls the central office 16 and discontinues call redirecting from the second telephone 14.

In another embodiment of the invention, an answering machine 22 with call-forwarding capability, may be used to redirect the calls that are made to the second telephone 14. Thus, in the foregoing example, the portable user preprograms the answering machine 22 with the location code of the base station 18 at the restaurant, either before he leaves his house or when he reaches the restaurant, by dialing the PID number to the base station 18 from any telephone. All incoming calls at the second telephone 14 receive a brief message informing the caller that the call is being redirected. The answering machine 22 dials the location code of the base station 18, sends the PID, and establishes a communication link between the first telephone 12 and the portable unit 21. In this case, automatic sign-off is only possible if the base station 18 received the "call-redirecting discontinue code" of the answering machine 22. After a predetermined number of unsuccessful attempts at establishing "on-premises" confirmation, the base station 18 dials the answering machine 22, and enters the call redirecting discontinue code.

According to another embodiment of the invention, users of portable (or mobile) radio-frequency (RF) devices 21 which have the capability of connecting to a public safety telephone network, may register with a central office 16 or RF central control facility. When the portable user initiates a call with his portable unit 21, a handshake sequence takes place between the portable 21 and the base 18. The portable user will then either receive a dial tone or a message on his display. The portable user may then disconnect the portable unit 21 (i.e., hang-up) and the base unit 18 will register the mobile user's location to the central office 16 or RF central control system. The information sent back to the central office 16 contains the mobile user's PID number which is cross-referenced to his home/office base phone number, the remote base's identification number (where the mobile user registered at), and the time of registration.

The time that the portable user is in a remote location may vary. Because of that variation, a duration may be programmed by the mobile user or central office for the length of time the calls will be routed to the last location that the user registered at. If a call has been routed to the remote location of where the mobile user has last registered, and no response is received from the portable unit 21, the central office 16 may divert the call back to the portable user's fixed location (i.e., home or office), or to a voice tank. (i.e., storage of a voice signal).

The system 10 may also include a feature that allows the portable user to program into the system the location or locations at which he will be located during the day. (e.g., the user is at home from 6 PM to 6 AM and at work from 7 AM to 5 PM.) The user enters a command which provides for call forwarding to home during the hours of 6 PM to 6 AM and to work from 7 AM to 5 PM. During the hours that the user is in transit, messages may be sent to a voice tank.

An additional feature allows the portable user, to travel freely throughout a city and have calls redirected to his portable 21. When the user remains in one location for a sufficiently long period of time (this depends on the type of location where the user is at), the portable 21 logs onto the system automatically. During logon the base system will transfer information back to the central office informing it of the location of the portable 21. From this time on, calls to the portable 21 will be forwarded to this location.

Periodically, the base station 18 will verify that the portable 21 is still present within that defined cell. If no response is received from the portable during the base's verification, the base 18 will report back to the central location 16 and reroute the calls back to the portable's fixed base or to a message center.

The location type is broadcasted periodically by the base 18 which is used to determine the amount of time a person is in one location. (e.g., in a restaurant or airport, the unit could log on to the base in five minutes, whereas it may take 10 minutes at a bus stop or fast food restaurant.

Figure 2:
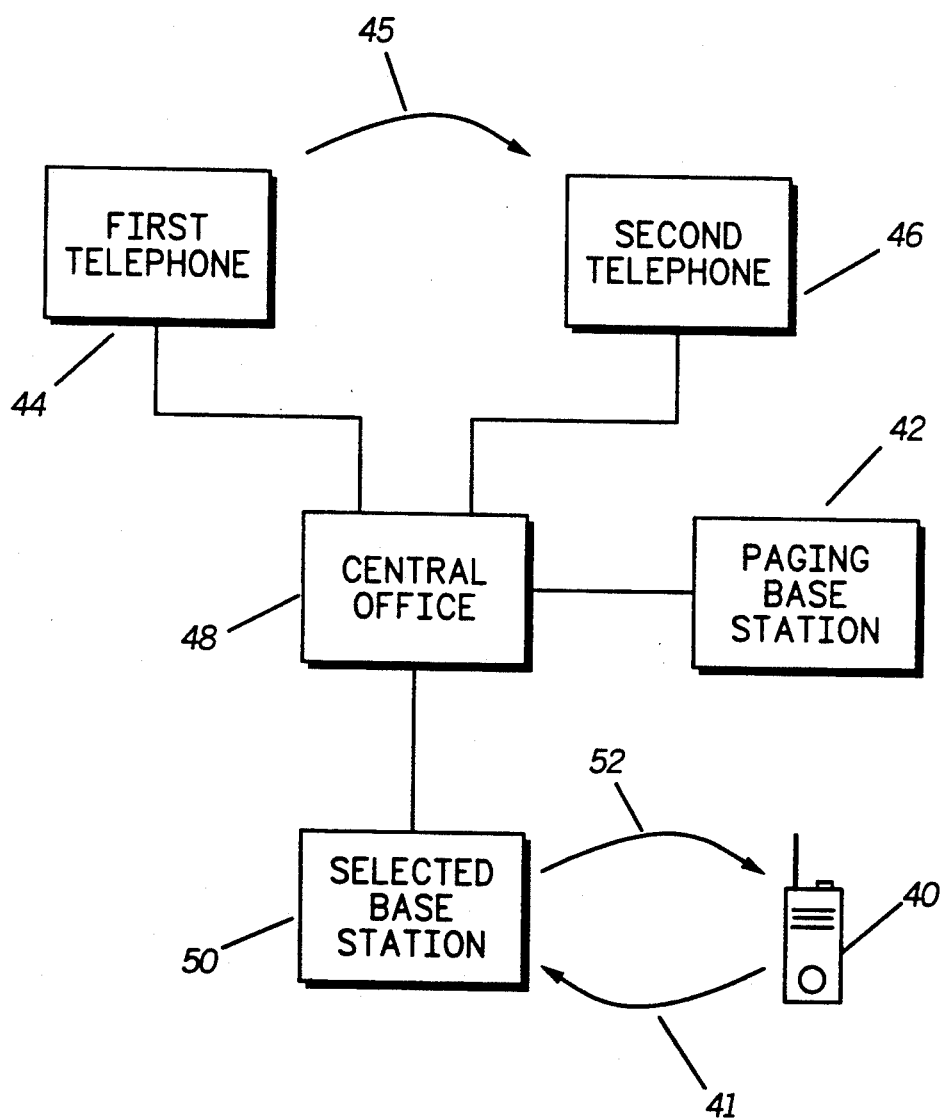
FIG. 2 shows another cordless telephone call redirecting system, using wide-area paging, in accordance with the invention.

Referring to FIG. 2, another embodiment of the invention is shown, wherein a user of a portable unit 40 with built-in wide-area paging may have calls that are directed to a second telephone 46 (e.g., a residential telephone) redirected to the portable unit 40, through a paging base station 42. For example, a call 45 from a first telephone 44 (i.e., any telephone within the same communication network) is directed to the second telephone 46. To initiate a call-redirection mode, the portable 40 sends a signal 41 to a paging base station 42 (through the selected base station 50). The signal 41 comprises the PID and the location code for the base station 50 (to which the calls are to be redirected for retransmission (52) to the portable 40), and a message instructing the paging base station 42 not to send out a page, but to provide the caller a "synthesized message" stating that the portable is registered for call-redirection and to stand-by during the call redirection procedure. Alternatively, if the portable user subscribes to the call redirection feature of a central office 48, he can dial the central office 48 and enter the location code for a selected base station 50. Once near the selected base station 50, an automatic (similar to the auto turn-off procedure) or manual sign-on scheme takes place, and all incoming calls to the second telephone 46 are forwarded to the selected base station 50.

In addition the portable user could automatically transfer all messages from a voice-mail system to the selected base station 50 after the portable 40 is registered at the selected base station 50 and the voice-mail system is instructed to redirect all calls. Similarly, others at the same location as the second telephone could simply dial a number (e.g., two digits) to automatically find the location of the portable 40.

Thus, communication systems in accordance with the invention provide users of portable units (or cordless telephone handsets) the ability to receive telephone calls (that are directed to a telephone at a home, office or other location) with the portable. In addition, the invention allows the portable user to use a selected remote base station (or a paging system) as a message center for transmitting messages to the portable.

What is claimed is:

1. In a communication system comprising a portable radio communication unit, a paging base station, a selected remote base station, a first telephone, and a second telephone, the cordless telephone communication system lacking the capability to automatically locate the portable radio unit without first polling and receiving an acknowledgment, a method for redirecting signals comprising the steps of:
    (a) transmitting a call-forwarding request signal with the portable radio communication unit, the call-forwarding request comprising a portable radio communication unit identification code, a location code for the selected remote base station, a message instructing the selected remote base station not to transmit paging signals and to provide a person, that is sending a call to the first telephone, a message stating that the paging base station is registered for call-redirection and to stand-by during a call redirection procedure; and
    (b) receiving the call-forwarding request signal with the paging base station and initiating a call forwarding procedure whereby the base station does not transmit paging signals and provides the person, that is sending a call to the first telephone, a message stating that the portable radio communication unit is registered for call-redirection, that the person is to stand-by during the call redirection procedure, and that calls from the second telephone that are directed to the first telephone are redirected to the portable radio communication unit.

* * * * *